(12) United States Patent
Merle

(10) Patent No.: US 6,215,107 B1
(45) Date of Patent: Apr. 10, 2001

(54) HEATING COIL FITTING WITH SHRUNK-ON COVER AND PROCESS FOR SAME

(76) Inventor: Herrn Dipl.-Ing. Bernd Merle, Ringstrasse 4, 36304 Alsfeld (DE)

( * ) Notice: Subject to any disclaimer, the term of this patent is extended or adjusted under 35 U.S.C. 154(b) by 0 days.

(21) Appl. No.: 09/256,560

(22) Filed: Feb. 24, 1999

(51) Int. Cl.$^7$ .................................................. H05B 3/58
(52) U.S. Cl. ............................................. 219/535; 219/548
(58) Field of Search ................................. 219/535, 536, 219/544, 545, 546, 548

(56) References Cited

U.S. PATENT DOCUMENTS

| | | | |
|---|---|---|---|
| 3,943,334 | 3/1976 | Sturm | 219/544 |
| 4,362,684 | 12/1982 | Thalmann | 264/230 |
| 4,628,191 | * 12/1986 | Piazzola | 219/535 |
| 4,906,313 | 3/1990 | Hill | 156/158 |
| 4,972,184 | 11/1990 | Yasunao et al. | 340/825.25 |
| 5,086,213 | * 2/1992 | Nussbaum et al. | 219/535 |
| 5,229,581 | * 7/1993 | Boulet D' Auria | 219/535 |

FOREIGN PATENT DOCUMENTS

| | | |
|---|---|---|
| 39 32 807 C1 | 5/1991 | (DE) . |
| 0378406A2 | 7/1990 | (EP) . |
| 0 585 974 A3 | 3/1994 | (EP) . |
| 2 452 048 | 10/1980 | (FR) . |
| 2 325 501 | 11/1998 | (GB) . |

* cited by examiner

*Primary Examiner*—Tu Ba Hoang
(74) *Attorney, Agent, or Firm*—Wood, Herron & Evans, L.L.P.

(57) ABSTRACT

A heating coil fitting for connecting at least two installation elements with a fitting pipe which overlaps the installation elements. The fitting pipe has a first material which breaks down during heating and a second material which shrinks during heating. A heating element in the fitting pipe wall has a cross-sectional surface area whose extent along the longitudinal axis of the fitting pipe is less than that in the radial direction of the fitting pipe.

8 Claims, 1 Drawing Sheet

HEATING COIL FITTING WITH SHRUNK-ON COVER AND PROCESS FOR SAME

FIELD OF THE INVENTION

The invention relates to a heating coil fitting and to a manufacturing process for such a fitting.

BACKGROUND OF THE INVENTION

Such heating coil fittings are used for the purpose of tightly connecting at least two installation elements, such as two pipes made of a synthetic material. For this purpose, the fitting pipe of the heating coil fitting, also produced from a synthetic material, has an interior heating coil that can be connected by means of two outwardly directed connection lines to an electrical power source. In order to tightly connect two synthetic pipes together, the pipes are slid into the fitting pipe, which has an interior diameter that is slightly greater than the outer diameter of the two pipes to be connected. Electric current is then directed to the heating coil, at which time part of the supplied power is converted into heat due to the inherent electrical resistance of the heating coil. This heat slowly penetrates, starting from the heating coil, the synthetic materials of the pipes and of the fitting. When the softening point or the melting range is exceeded, these materials break down or become soft and flow into each other. During cooling, they then harden forming a gas- or liquid-tight connection between the two pipes and the fitting. For this process, the term "heating coil welding" or "welding" is also used.

When a heating coil fitting is used for the purpose of tightly connecting the installation elements or mountings, of which at least one is made of a synthetic material, various aspects must be considered which are partially in opposition to each other. At first, it must be noted that the softening or melting temperature is exceeded for a sufficiently great volume at the connection point of, for example, the two synthetic pipes and the fitting. In other words, a thorough heating must occur at the two pipes and the fitting. If the heating is not thorough enough, the result is an insufficient stability after hardening, and if too thorough, this results in deformation during the warming or heating phase. Furthermore, a certain temperature above the softening or melting temperature must not be exceeded anywhere in the material(s), otherwise chemical aging or embrittlement of the synthetic material(s) occurs. Finally, during the welding process, a joining pressure must be built up in the connection or weld zone in order to assure sufficient cross-linking or a sufficient penetration of the material of the synthetic pipes and the fitting.

With the heating coil fittings known in practice, the above-mentioned joining pressure is achieved exclusively through the thermal expansion of the synthetic material and by the parasitic shrinkage of the injection-molded fitting pipes. Here, it has been shown to be disadvantageous that the width of the gap between, for example, two synthetic pipes and the heating coil fitting to be connected is not clearly defined prior to the fusion process. There may be gaps of several millimeters, particularly in the case of large heating coil fittings. This may lead to an insufficient thermal contact between the two installation elements to be connected and the heating coil fitting, as well as to an insufficient joining pressure, which necessarily leads to loose connections.

In U.S. Pat. No. 4,972,184, a heating coil fitting is disclosed whose pipe wall is constructed from two pipe-like layers. Here, along the external periphery of the first pipe-like layer, the second pipe-like layer is arranged coaxially. Between the two pipe-like layers, a helically extending heating wire is provided. The first layer, which is on the inside, is produced from a thermoplastic material. In contrast thereto, the external second layer of the fitting is produced from a thermosetting plastic material.

The installation elements to be connected with this known heating coil fitting are also constructed in two layers, wherein with respect to the material, the internal first layer of the installation elements corresponds to the external, second layer of the heating coil fitting and the external second layer of the installation elements corresponds to the internal first layer of the heating coil fitting. The external second layer of the installation elements, as well as the internal first layer of the heating coil fitting, assure, due to their thermoplastic material, a good material bond between the individual structyural components during the fusion process. In contrast thereto, the internal first layer of the installation elements, as well as the externally located second layer of the heting coil fitting, are to assure a sufficient stability of form. for this reason, particularly the latter layers must not undergo anyt change in form during the connection process, since otherwise a tight connection can no longer be assured. For this reason, in the case of relatively large gaps between the components to be connected, there exists the same problems with respect to an insufficient contact between the parts and the insufficient joining pressure, as already mentioned above in connection with the heating coil fittings known from practice.

Furthermore, the European Patent Application No. 0,378,406 also relates to a heating coil fitting with a two-layer construction, wherein the interior layer consists of a non-cross-linked polyolefin and the exterior layer consists of cross-linked polyolefin. The purpose of the interior layer, which is not cross-linked, is to assure a better bond between the material of this layer and the externally located material of the installation elements. Measures for eliminating dimensional tolerances are not discussed in this European Patent Application No. 0,378,406.

It is the task of the present invention to create a heating coil fitting as well as a manufacturing process for this purpose which makes possible a tight bond, independently of the diameter of the pipes to be connected and the fitting.

SUMMARY OF THE INVENTION

The present task, with respect to the heating coil fittings, is solved by the characteristics of the present invention. Due to the inhomogeneous formation of the fitting pipe from a first material, which during heating at least breaks down or softens, preferably melts, and a second material which preferably, at least during heating, is subjected to a shrinking process, on the one hand, the penetration or fusion of the installation elements to be connected, as well as of the heating coil fittings, is supported and, on the other hand, a sufficiently high joining pressure is achieved through the shrinking process of the second material. For this reason, it is possible, even in the case of heating coil fittings with a large diameter and/or with connections with a large gap between the inner circumferential wall of the heating coil fitting and the outer circumferential walls of the two installation elements to be connected, a secure and tight connection can be achieved. In this context, it must be noted that in the case of a heating coil fitting with which, for example, a synthetic pipe is to be connected to a valve made of metal or the like, the above-described inhomogeneous construction of the heating coil fitting can also extend only across a section in the longitudinal direction of the heating coil fitting, i.e., across that area in which the synthetic pipe is accommodated.

Basically, there exists the possibility that the inhomogeneous construction of the heating coil fitting is achieved in that the second material subjected to the shrinking process is integrated in the nonshrinkable first material. An additional advantageous embodiment of the present invention consists in that the pipe wall of the fitting pipe has a sandwich-like structure in which at least a first, preferably pipe-like, layer of the first material, and at least a second, also preferably pipe-like, layer of the second material are provided. Several layers of the first material and/or of the second material may, of course, be used.

Here, provisions may be made wherein the first layer of the first material is concentrically surrounded by the second layer of the second material. For example, this may be realized in that the fitting pipe contains at least one core cover accommodating the heating element in the form of a heating coil, for example, and which consists of the first material, preferably of a synthetic material which during heating at least softens, and contains at least one external cover, concentrically surrounding the core cover and consisting of the second material, preferably of a thermally shrinking material.

In order to prevent the molten material from squeezing out of the gap between the fitting pipe and the installation elements to be connected during the fusion of the installation elements and the fitting, further provisions may be made whereby the heating element is arranged in the interior of the fitting pipe, with unheated regions provided along the longitudinal extent of the pipe. Preferably, these unheated or cold zones may be provided at the two end surfaces of the fitting pipe and/or the center of the fitting pipe.

For the first material, for example, a thermoplastic, such as polyethylene, cross-linked polyethylene, polypropylene, etc. may be provided, whereas for the second material particularly a thermoshrinking material, as known, for example, from a heat-shrunk plastic tubing or, for example a cross-linked polyethylene, a synthetic material with a memory effect, etc. may be used.

For the heating conductor of the heating element, preferably in the form of a heating coil, any material having a sufficiently high electrical resistance may be used for the conversion of the supplied electrical power into heat energy sufficient for carrying out a fusion process. Preferably, the heating conductor may consist of a copper alloy. Also, copper, nickel alloys, maganin, constantan, conductive synthetic materials, etc., can be used as the material for the heating conductor.

In order to achieve a better, particularly a faster heating of the heating coil fitting, provisions may also be made wherein the heating conductor used for the heating element is provided with a cross-sectional shape whose expansion along the central longitudinal axis of the fitting pipe is less than in the radial direction since the heat more readily penetrates deeply via the better heat conductivity of the heating conductor or is produced there directly. In particular, in the case of fittings with great wall thickness or a large diameter it is thus possible to achieve a rapid, particularly a gas- or fluid-tight fusion of the installation elements, mountings, etc., despite the large diameter or the large wall thickness, since the heating conductor radially penetrates the fitting pipe to a sufficient depth. Also, there does not exist the danger that the material in the vicinity of the interior peripheral area of the fitting pipe has already been subjected to chemical aging while the material connecting thereto in the direction of the external peripheral surface has not yet reached the temperature necessary for an optimum bonding of the installation elements. Through an appropriate selection of the aspect ratio, i.e. the relationship of width to the height of said cross-sectional surface of the heating conductor, this can be optimized with respect to optimum heating and stability. This concept, as well as the additional advantageous embodiments connected herewith, may also be used in an advantageous manner, independently of the inhomogeneous construction of the pipe wall in the case of heating coil fittings.

The radial expansion of the cross-sectional surface of the heating conductor may be selected in any desired manner as long as the previously mentioned condition is met. It has been proven to be advantageous that the radial expansion of the heating conductor should be at least 30% of the radial wall thickness of the fitting. In this way it is assured that the heat energy will be introduced quickly into the material of the pipe wall of the heating coil fitting.

Basically, any desired cross-sectional surface geometry for the heating conductor may be selected as long as the above condition is met. It has been proven to be particularly advantageous when the cross-sectional surface is at least approximately rectangular, wherein the long and short side of the rectangle extends essentially parallel to the central longitudinal axis of the fitting pipe and the longitudinal side extends essentially in the radial direction of the fitting pipe.

With a rectangular embodiment of the heating conductor it has been proven to be advantageous if the ratio of height to width of the rectangular heating conductor is at least 5:2.

A particularly good connection is achieved in that the heating conductor of the heating element, which is preferably formed by the heating coil, ends flush with the interior peripheral area of the heating pipe. If the cross-sectional surface of the heating element has a rectangular form, then a good heating of the two installation elements to be connected is achieved thereby, particularly since in contrast to the known heating coil fittings have a heating coil conductor with a circular crosssection, a planar contact between the heating conductor and the given installation element is achieved. In contrast thereto, with the known heating coil fittings there exists merely a linear contact.

The pitch of the coil-like heating conductor may be selected in any desired manner, depending on the conditions. It has been proven to be advantageous if the pitch correspond at least to the height of the heating conductor or its radial extent.

Depending on the selected material for the heating conductor of the heating element, it may be sufficient, for example, if it is simply wound into a heating coil. However, in order to prevent the heating conductor from breaking while it is being wound into a coil, it may also be advantageous if the heating conductor is provided with notches on its side facing away from the interior peripheral area of the fitting pipe. Naturally, the notches may also be provided on the side directed toward the interior peripheral area of the fitting pipe or may be provided in any desired position at the heating conductor. Furthermore, these notches may be arranged in the longitudinal direction of the heating conductor at uniform as well as nonuniform distances from each other.

Basically, there exists the possibility of providing several heating elements in one fitting pipe. Such a solution presents itself, for example, in the case of a T-shaped fitting pipe which, for example, may be used for connecting three pipes. If the fitting pipe is provided merely for the purpose of connecting, for example, two synthetic pipes, then it is advantageous if a heating element extends across the entire axial length of the fitting pipe.

As already addressed above, the present invention is not limited to the use of heating coil fittings which are provided for the connection of two pipes. For example, it may also be provided for T-shaped heating coil fittings which are provided for the connection of three pipes, etc. Furthermore, the heating coil fitting of the invention may also be used in such a way that merely one synthetic pipe, for example, is introduced at first and is fused to the heating coil fitting. The other installation element or the other mounting may then be formed by a synthetic pipe still to be introduced later, a valve made of metal which can be screwed into the free end of the fitting pipe or a valve made of a synthetic material, a hose, etc. With such an arrangement it is advantageous for the heating coil fitting to have two heating elements which can be independently controlled so that with one heating element the initially introduced synthetic pipe can be fused to the heating coil fitting, whereas the second heating element can then serve for connecting the remaining installation element to the heating coil fitting. Naturally, the number of heating elements to be provided in the heating coil fitting is not fixed. The number of heating elements appropriate for each desired purpose is possible.

With respect to the process, the task at hand is solved by the process of the present invention wherein at least one outer cover surrounding the core cover is provided which is produced from a material that shrinks at least during heating and that has an inner diameter smaller than the outer diameter of the core cover, and for the placement of the outer cover onto the core cover, the inner diameter of the outer cover is widened. Due to the shrinkage of the material of the outer cover, the outer cover can automatically adapt itself to the core cover.

Additional advantageous embodiments as well as an example are shown in greater detail below with reference to the attached figures of the drawings, wherein:

DETAILED DESCRIPTION OF THE INVENTION

Figure 1:
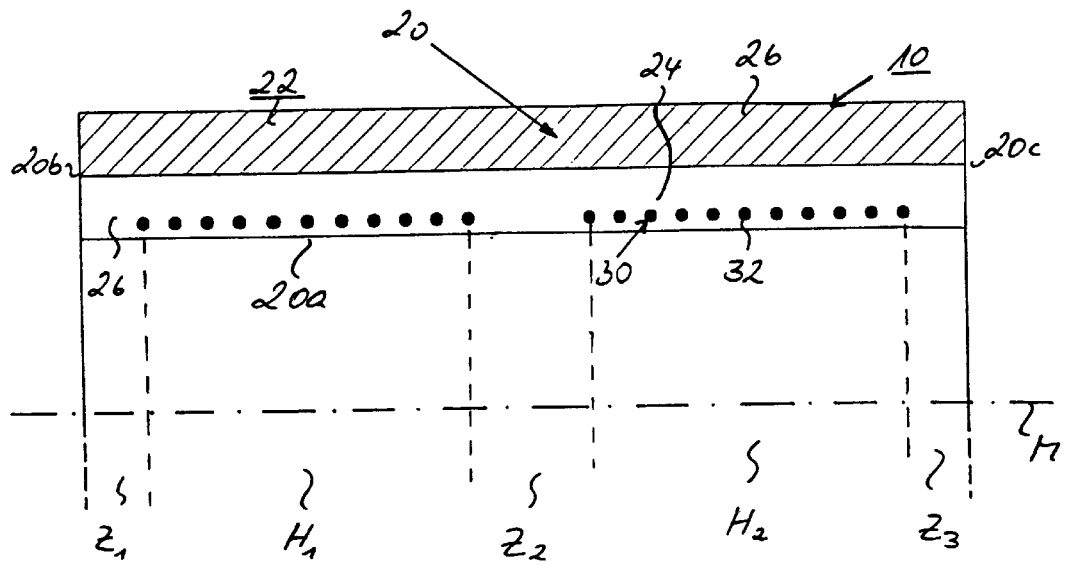
FIG. 1 shows a partial cross-sectional view in the longitudinal direction of the heating coil fitting of the invention.
Figure 2:
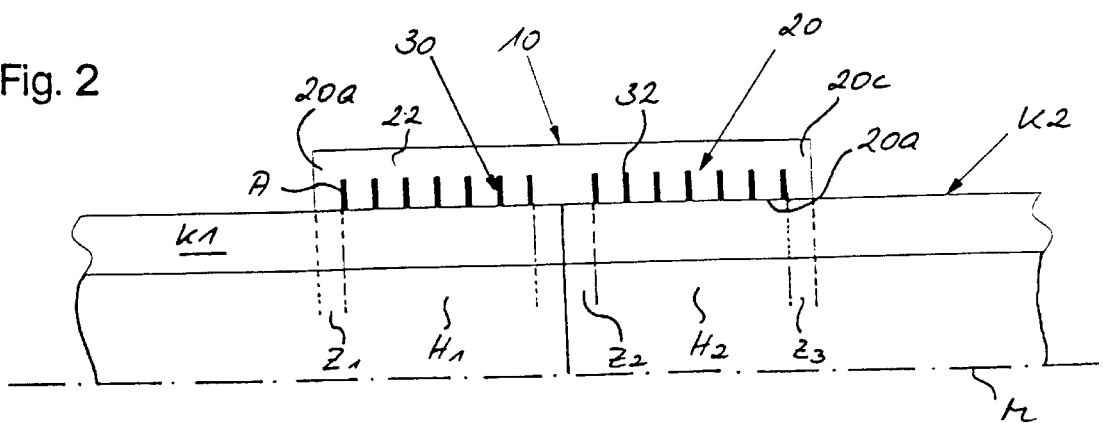
FIG. 2 shows a partial cross-sectional view in the longitudinal direction of an additional example of a fitting of the invention.

In the FIGS. 1 and 2, respectively, in a partial longitudinal cross-section, a heating coil fitting (10) of the invention is shown. Its central longitudinal axis or its longitudinal axis of symmetry (M) extends horizontally with respect to FIGS. 1 and 2. In FIGS. 1 and 2, identical components are identified by the same reference numerals.

The heating coil fitting (10) of FIG. 1 has a fitting pipe (20) and a heating element (30) preferably in the form of a heating coil. The pipe wall (22) defining the fitting pipe (20) comprises a core cover (24) forming a first pipe-like layer and an outer cover (26) forming a second pipe-like layer, which surrounds the core cover (24) concentrically. Here, the outer cover (26) rests flat against the core cover (24). As shown in FIG. 1. the outer cover (26) ends flush at the end surfaces together with the core cover (24). However, basically, there also exists the possibility that the outer cover (26) has a longer or shorter axial length than the core cover (24).

The core cover (24) consists of a material which during heating at least breaks down or softens, preferably a thermoplastic synthetic material. In the interior of the core cover (24), the heating conductor (32) of the heating coil (30), which preferably is made of a copper alloy and is provided in this example with a round cross section, is arranged in such a way that it is located in the vicinity of the inner peripheral wall (20a) of the fitting pipe (20) or of the core cover (24) in the interior of the core cover (24). The heating conductor (32) is wound in spiral form and can be connected via connection ends, not shown in greater detail, to an electrical power source.

As can be seen from FIG. 1, the heating conductor (32) of the heating coil (30) is arranged in the interior of the core cover (24) in such a way that there appears two heating areas ($H_1$, $H_2$) and three unheated or "cold" zones ($Z_1$, $Z_2$, $Z_3$). In other words, the heating conductor (32) of the heating oil (30) has two areas ($H_1$, $H_2$) in which eleven windings each are present, wherein these two areas ($H_1$, $H_2$) are separated from each other by an unheated zone ($Z_2$) in the axial direction of the heating coil fitting (10). At the two front ends (20b, 20c) of the fitting pipe (20) also unheated zones ($Z_1$, $Z_3$) are provided which extend axially from the respective front end (20b, 20c) into the interior of the fitting pipe (20) or the core cover (24).

The outer cover (26) of the heating coil fitting (10) consists of a shrinkable material, for example cross-linked polyethylene, a synthetic material with memory effect, etc. Preferably, at least during heating of the outer cover (26) by means of the heating coil (30), the material of the outer cover (26) shrinks and thereby exerts a pressure on the core cover (24) as well as on the two pipes, made preferably of a thermoplastic synthetic material, which are to be connected to each other and are, however, not shown in FIG. 1.

For the manufacture of the heating coil fitting (10) of the invention, at first the core cover (24) is provided with the heating coil (30). The outer cover (26) is then applied to the core cover (24). For this purpose, the outer cover (26) has an inner diameter that is smaller than the outer diameter of the core cover (24). Following a widening of the inner diameter of the outer cover (26), the outer cover (26) may be slid onto the outer peripheral area of the core cover (24). Due to the shrinkage of the outer cover (26), the outer cover (26) then rests firmly against the core cover (24).

An additional example of a heating coil fitting (10) of the invention is shown in FIG. 2. With this heating coil fitting, the separation into a core cover and an outer cover has been omitted for the purpose of clarity with respect to the concept of the invention.

As can be seen from FIG. 2, the heating conductor (32) of the heating coil (30) has a rectangular cross section or a rectangular cross-sectional surface (A), wherein the cross section extends in a plane containing the central longitudinal axis (M) of the fitting pipe (20), is less than its length in the radial direction of the pipe (20). Preferably, the ratio between the axial length of the cross-sectional surface (A) (=width of the cross-sectional surface A) and of the radial length of the cross-sectional surface (A) (=height of the cross-sectional surface A) is 2:5. The heating conductor (32) thus penetrates the material of the fitting pipe (20) much more deeply compared to a fitting pipe having the same wall thickness and a heating conductor with a round cross section, as is demonstrated by a simple comparison of the FIGS. 1 and 2. It has been proven to be advantageous if the radial extent of the heating conductor (32) or the height of the cross-sectional surface (A) is at least 30% of the radial wall thickness of the pipe wall (22). Due to the rectangular cross section of the heating conductor (32), the distance between two successive heating conductor coils is also constant, so that, in contrast to the state of the art, with a heating conductor having a circular cross section, the intermediate areas between two successive heating conductor coils are heated evenly. The distance or the pitch of the coil-like heating conductor (32) corresponds preferably at least to the length of the radial extent of the heating conductor (32).

Figure 3:
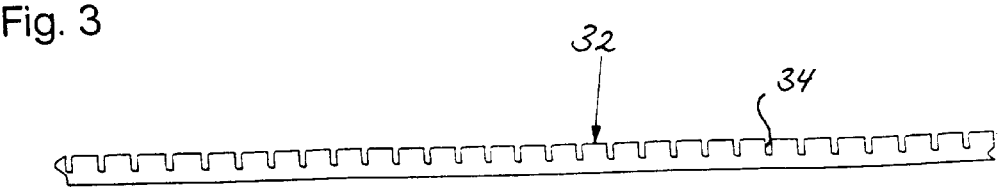
FIG. 3 shows a side view of a heating conductor for a heating element of a heating coil fitting of the invention.

In FIG. 3, a side view of the heating conductor (32) of the heating coil fitting (30) of the invention is shown, wherein the heating conductor is produced, for example, from a copper alloy. As can be gathered therefrom, the heating conductor (32) is provided at regular intervals on its side facing away from the inner peripheral surface (22) of the fitting pipe (20) with notches (34) arranged at equal intervals. Among other things, these notches (34) make possible a spiral-like winding of the heating conductor (32) into a heating coil (30) without breaking.

As can also be gathered from FIG. 2, with the heating coil fitting (10) of the heating conductors (32) of the invention, the heating conductor (30) ends flush with the inner peripheral area (20a) of the fitting pipe (20). Moreover, due to the rectangular cross section of the heating conductor (32) of the heating coil (30), in contrast to a heating conductor of round cross section, a better heating of the two pipes (K1, K2) that are to be connected is also achieved since the heating conductor (32) "stands" with its wide side on the pipes to be connected with each other. In contrast, with a heating conductor having a circular cross section, as is often the case in the state of the art, only one line of contact between the heating conductor and the two pipes (K1, K2) to be connected with each other is possible.

As has already been shown above, the heating coil (30) is arranged in the fitting pipe (20) in order to prevent a flowing out of warm synthetic material from the heating coil fitting (10), so that, altogether, three unheated zones or "cold" zones ($Z_1$, $Z_2$, $Z_3$) are present between the two heated zones ($H_1$, $H_2$) which, respectively, comprise seven windings or coils. The unheated zones ($Z_1$, $Z_3$) extend from the end surfaces (20b, 20c) of the fitting pipe (20) axially toward the inside. The third "cold" zone ($Z_2$) is located in the center of the fitting pipe (20).

I claim:
1. Heating coil fitting for connecting at least two installation elements (K1, K2), of which at least one is made of a synthetic material, with a fitting pipe (20) having a pipe wall (22) and which overlaps at least the two installation elements (K1, K2) to be connected to each other, and with at least one heating element (30) arranged at least in sections in the pipe wall (22) of the fitting pipe (20), wherein the pipe wall (22) of the fitting pipe (20) has at least in sections an inhomogenous assembly with at least a first material which at least breaks down during heating, wherein for the inhomogeneous assembly of the pipe wall (22) of the fitting pipe (20), at least a second material of cross-linked polyethylene is also provided which is subjected to a shrinking process during heating, wherein the heating conductor (32) forming the heating element (30), with respect to a cross-sectional plane containing the central longitudinal axis (M) of the fitting pipe (20), has a cross-sectional surface (A) whose extent in the direction of the central longitudinal axis (M) of the fitting pipe (20) is less than in the radial direction with respect to the fitting pipe (20).

2. Heating coil fitting, in accordance with claim 1, wherein the second material (26) is integrated in the first material (24).

3. Heating coil fitting, in accordance with claim 1, wherein the pipe wall (22) of the fitting pipe (20) is formed from at least a first layer of the first material (24) and of at least a second layer of the second material (26).

4. Heating coil fitting, in accordance with claim 3, wherein the first layer, made of the first material (24), is concentrically surrounded by the second layer made of the second material (26).

5. Heating coil fitting, in accordance with one of claims 1 to 4, wherein the heating element (30) is arranged in the interior of the fitting pipe (20) in such a way that there appear unheated zones ($Z_1$, $Z_2$, $Z_3$).

6. Heating coil fitting, in accordance with one of claims 1 to 4, wherein the radial extent of the heating conductor (32) is at least 30% of the radial wall thickness of the pipe wall (22).

7. Heating coil fitting, in accordance with one of claims 1 to 4, wherein the cross-sectional surface (A) is rectangular and in that the ratio of the radial extent to the axial expansion of the cross-sectional surface (A) is 5:2.

8. Heating coil fitting, in accordance with one of the claims 1 to 4, wherein the heating conductor is helically wound into a helix having a pitch, the pitch of the helically wound heating conductor (32) corresponds at least to the radial extent of the heating conductor (32).

* * * * *